US012694108B2

(12) United States Patent  
Meyers et al.

(10) Patent No.: US 12,694,108 B2  
(45) Date of Patent: Jul. 28, 2026

(54) DECEPTION-BASED RESPONSES TO SECURITY ATTACKS

(71) Applicant: CrowdStrike, Inc., Sunnyvale, CA (US)

(72) Inventors: Adam S. Meyers, Washington, DC (US); David F. Diehl, Minneapolis, MN (US); Dmitri Alperovitch, Gaithersburg, MD (US); George Robert Kurtz, Ladera Ranch, CA (US); Sven Krasser, Los Angeles, CA (US)

(73) Assignee: CrowdStrike, Inc., Sunnyvale, CA (US)

( * ) Notice: Subject to any disclaimer, the term of this patent is extended or adjusted under 35 U.S.C. 154(b) by 25 days.

(21) Appl. No.: 18/480,345

(22) Filed: Oct. 3, 2023

(65) Prior Publication Data

US 2024/0028717 A1     Jan. 25, 2024

Related U.S. Application Data

(63) Continuation of application No. 16/885,174, filed on May 27, 2020, now Pat. No. 11,809,555, which is a
(Continued)

(51) Int. Cl.  
*G06F 21/56* (2013.01)  
*G06F 21/55* (2013.01)  
(Continued)

(52) U.S. Cl.  
CPC ............. *G06F 21/56* (2013.01); *G06F 21/554* (2013.01); *G06F 21/6209* (2013.01);  
(Continued)

(58) Field of Classification Search  
CPC ..... G06F 21/56; G06F 21/554; G06F 21/6209  
(Continued)

(56) References Cited

U.S. PATENT DOCUMENTS 7,376,969 B1     5/2008 Njemanze et al.  
7,437,766 B2    10/2008 Cohen et al.  
(Continued)

FOREIGN PATENT DOCUMENTS

EP            2611115 A2     7/2013  
JP         2002007234         1/2002  
(Continued)

OTHER PUBLICATIONS

Joey F. George; The Role of E-Training in Protecting Information Assets Against Deception Attacks; Researchgate: Year: 2008; pp. 1-13.*

(Continued)

*Primary Examiner* — Monjur Rahim  
(74) *Attorney, Agent, or Firm* — Lee & Hayes, P.C.

(57) ABSTRACT

Deception-based techniques for responding to security attacks are described herein. The techniques include transitioning a security attack to a monitored computing device posing as a computing device impacted by the security attack and enabling the adversary to obtain deceptive information from the monitored computing device. Also, the adversary may obtain a document configured to report identifying information of an entity opening the document, thereby identifying the adversary associated with the attack. Further, the techniques include determining that a domain specified in a domain name request is associated with malicious activity and responding to the request with a network address of a monitored computing device to cause the requesting process to communicate with the monitored computing device in place of an adversary server. Additionally, a service may monitor dormant domains names associated with malicious activity and, in response to a change, respond with an alert or a configuration update.

20 Claims, 6 Drawing Sheets

Related U.S. Application Data continuation of application No. 13/784,720, filed on Mar. 4, 2013, now Pat. No. 10,713,356.

(51) Int. Cl.
| | | |
|---|---|---|
| *G06F 21/62* | (2013.01) | |
| *H04L 9/40* | (2022.01) | |
| *H04L 61/4511* | (2022.01) | |

(52) U.S. Cl.
CPC ...... *H04L 61/4511* (2022.05); *H04L 63/1491* (2013.01); *G06F 2221/2111* (2013.01); *G06F 2221/2129* (2013.01)

(58) Field of Classification Search
USPC .......................................................... 726/22
See application file for complete search history.

(56) References Cited

U.S. PATENT DOCUMENTS

| | | | | |
|---|---|---|---|---|
| 8,260,914 | B1 * | 9/2012 | Ranjan .................... | H04L 63/12 709/224 |
| 8,347,394 | B1 * | 1/2013 | Lee ....................... | G06F 21/554 726/25 |
| 8,549,643 | B1 | 10/2013 | Shou | |
| 9,497,212 | B2 | 11/2016 | Turnbull | |
| 9,749,336 | B1 * | 8/2017 | Zhang .................... | H04L 63/14 |
| 10,298,598 | B1 * | 5/2019 | McClintock ........ | H04L 63/1483 |
| 2002/0066034 | A1 * | 5/2002 | Schlossberg ........ | H04L 63/1416 726/23 |
| 2002/0091827 | A1 | 7/2002 | King et al. | |
| 2003/0105975 | A1 | 6/2003 | Nagoya et al. | |
| 2004/0049747 | A1 * | 3/2004 | Yamasaki ............... | G06F 30/33 716/112 |
| 2004/0139170 | A1 * | 7/2004 | Shen ....................... | H04L 67/56 709/227 |
| 2004/0148521 | A1 | 7/2004 | Cohen et al. | |
| 2005/0091516 | A1 | 4/2005 | Mcdermott | |
| 2005/0203875 | A1 * | 9/2005 | Mohammed ........ | H04L 43/0817 |
| 2006/0008087 | A1 | 1/2006 | Olive | |
| 2006/0021029 | A1 | 1/2006 | Brickell et al. | |
| 2006/0068755 | A1 * | 3/2006 | Shraim ................. | H04M 15/47 455/410 |
| 2006/0161982 | A1 | 7/2006 | Chari et al. | |
| 2007/0106993 | A1 | 5/2007 | Largman et al. | |
| 2007/0118669 | A1 | 5/2007 | Rand et al. | |
| 2007/0226799 | A1 | 9/2007 | Gopalan et al. | |
| 2008/0016339 | A1 | 1/2008 | Shukla | |
| 2008/0270203 | A1 * | 10/2008 | Holmes .............. | G06Q 30/0201 705/7.29 |
| 2009/0059936 | A1 | 3/2009 | Van De Poel et al. | |
| 2009/0193403 | A1 | 7/2009 | Bloom et al. | |
| 2010/0077483 | A1 * | 3/2010 | Stolfo .................... | G06F 21/554 726/23 |
| 2010/0115043 | A1 | 5/2010 | King et al. | |
| 2010/0269175 | A1 | 10/2010 | Stolfo et al. | |
| 2011/0191455 | A1 * | 8/2011 | Gardner .............. | H04L 61/4511 709/223 |
| 2011/0276597 | A1 * | 11/2011 | Little ................. | H04L 63/1416 709/227 |
| 2012/0054839 | A1 * | 3/2012 | Friedlander ......... | H04W 12/068 726/5 |
| 2012/0054869 | A1 | 3/2012 | Yen et al. | |
| 2012/0066773 | A1 | 3/2012 | Weisberger | |
| 2012/0084860 | A1 | 4/2012 | Cao et al. | |
| 2012/0084866 | A1 | 4/2012 | Stolfo | |
| 2012/0151553 | A1 | 6/2012 | Burgess et al. | |
| 2012/0303808 | A1 | 11/2012 | Xie | |
| 2013/0139259 | A1 | 5/2013 | Tegreene | |
| 2013/0145465 | A1 | 6/2013 | Wang et al. | |
| 2013/0160079 | A1 * | 6/2013 | Hebert .................. | H04L 63/145 726/3 |
| 2014/0007238 | A1 | 1/2014 | Magee et al. | |
| 2014/0250524 | A1 | 9/2014 | Meyers et al. | |
| 2017/0099314 | A1 * | 4/2017 | Klatt ................... | H04L 63/1483 |
| 2020/0285739 | A1 | 9/2020 | Meyers et al. | |
| 2020/0285740 | A1 | 9/2020 | Meyers et al. | |

FOREIGN PATENT DOCUMENTS

| | | | |
|---|---|---|---|
| JP | 2008172548 | 7/2008 | |
| JP | 2010092235 | 4/2010 | |
| JP | 2011517859 | 6/2011 | |
| JP | 2012212391 | 11/2012 | |
| KR | 100985049 | 10/2010 | |
| KR | 101115250 | 2/2012 | |
| WO | WO02098100 A1 | 12/2002 | |
| WO | WO-2009032379 A1 * | 3/2009 | ......... H04L 63/1491 |

OTHER PUBLICATIONS

Anonymous, "Debouncer—FAQ", Dec. 29, 2010, retrieved from the internet at URL:http:/web.archive.org/web/20101229000915/http://www.debouncer.com/faq, retrieved on Feb. 10, 2017, 4 pgs.

Comparetti, et al., "Prospex: Protocol Specification Extraction", 30th IEEE Symposium on Security and Privacy, May 17, 2009, pp. 110-125.

European Office Action mailed on Dec. 5, 2019 for European Patent Application No. 14760569.5, a counterpart of U.S. Appl. No. 13/784,720, 7 pages.

European Office Action mailed Feb. 16, 2022 for European Patent Application No. 20179896.4, a foreign counterpart to U.S. Pat. No. 10,713,356, 6 pages.

European Office Action mailed Feburay 17, 2022 for European Patent Application No. 20179897.2, a foreign counterpart to U.S. Pat. No. 10,713,356, 6 pages.

Partial Supplementary European Search Report mailed Oct. 6, 2016 for European Patent Application No. 14760569.5, 9 pages.

Extended European Search Report mailed on Feb. 21, 2017 for European patent application No. 14760569.5, 18 pages.

Extended European Search Report mailed on Aug. 18, 2020 for European Patent Application No. 20179896.4, 9 pages.

Extended European Search Report mailed on Aug. 24, 2020 for European Patent Application No. 20179897.2, 8 pages.

Extended European Search Report mailed on Sep. 16, 2020 for European Patent Application No. 20179898.0, 8 pages.

Israeli Office Action mailed May 25, 2018 for Israeli patent application No. 240743, a counterpart foreign application of U.S. Appl. No. 13/784,720, 8 pages.

Jones, et al., "Computer System Intrusion Detection: A Survey", CITESEER, 2000, pp. 1-25.

Translated the Japanese Office Action mailed Jan. 9, 2018 for Japanese Patent Application No. 2015-561387, a counterpart foreign application of U.S. Appl. No. 13/784,720, 12 pages.

Japanese Office Action mailed Oct. 2, 2018 for Japanese patent application No. 2015-561387, a counterpart foreign application of U.S. Appl. No. 13/784,720.

Office Action for U.S. Appl. No. 16/885,169, mailed on Mar. 31, 2023, Adam Meyers, "Deception-Based Responses to Security Attacks", 11 pages.

Non Final Office Action dtd Apr. 5, 2019 for U.S. Appl. No. 13/784,720 "Deception-Based Responses to Security Attacks" Meyers, 16 pages.

Office Action for U.S. Appl. No. 13/784,720, mailed on Jan. 27, 2017, Meyers, "Deception-Based Responses to Security Attacks", 16 pages.

Office Action for U.S. Appl. No. 16/885,174, mailed on Oct. 11, 2022, Meyers, "Deception-Based Responses to Security Attacks", 12 Pages.

Final Office Action dated Oct. 18, 2019 for U.S. Appl. No. 13/784,720 "Deception-Based Responses to Security Attacks" Meyers, 16 pages.

Final Office Action for U.S. Appl. No. 13/784,720, mailed on Oct. 8, 2015, Adam S. Meyers, "Deception-Based Responses to Security Attacks", 18 pages.

Office Action for U.S. Appl. No. 13/784,720, mailed on Dec. 28, 2017, Meyers, "Deception-Based Responses to Security Attacks", 13 pages.

(56) References Cited

OTHER PUBLICATIONS

Office Action for U.S. Appl. No. 13/784,720, mailed on Feb. 13, 2015, Adam S. Meyers, "Deception-Based Responses to Security Attacks", 12 pages.
Office Action for U.S. Appl. No. 16/885,169, mailed on Apr. 1, 2022, Meyers, "Deception-Based Responses to Security Attacks", 9 Pages.
Office Action for U.S. Appl. No. 16/885,174, mailed on Apr. 28, 2022, Meyers, "Deception-Based Responses to Security Attacks", 12 pages.
Office Action for U.S. Appl. No. 13/784,720, mailed on May 23, 2014, Adam S. Meyers, "Deception-Based Responses to Security Attacks", 15 pages.
Final Office Action for U.S. Appl. No. 13/784,720, mailed on Jul. 18, 2016, Adam S. Meyers, "Deception-Based Responses to Security Attacks", 14 pages.
Office Action for U.S. Appl. No. 13/784,720, mailed on Aug. 23, 2018, Adam S. Meyers, "Deception-Based Responses to Security Attacks", 16 pages.
PCT Search Report and Written Opinion mailed Jun. 18, 2014 for PCT application No. PCT/US14/17950, 18 pages.

Pelletier, "Using honeypots for connection redirection", retrieved on Sep. 20, 2016 at << http://www.networkworld.com/article/ 2333508/lan-wan/using-honeypots-for-connection-redirection>>, Network World, Jun. 3, 2004, 3 pages.
Singapore Office Action mailed May 2, 2017 for Singapore patent application No. 11201506719Q, a counterpart foreign application of U.S. Appl. No. 13/784,720, 5 pages.
Singapore Office Action mailed Jul. 12, 2016 for Singapore patent application No. 11201506719Q, a counterpart foreign application of U.S. Appl. No. 13/784,720, 7 pages.
David Swift, "A Practical Application of SIM/SEM/SIEM Automating Threat Identification", retrieved on Nov. 13, 2017 at << https://www .sans.org/reading-room/whitepapers/logging/ practicalapplication-sim-sem-siem-automating-threat-identification- 1781, InfoSec Reading Room, Jan. 1, 2007, 42 pages.
Yuill, et al., "Honeyfiles: Deceptive Files for Intrusion Detection", Proceedings of the 2004 IEEE Workshop on Information Assurance, United States Military Academy, West Point, NY, Jun. 10-11, 2004, IEEE, 2004, pp. 116-122.
Office Action for U.S. Appl. 16/885,169, mailed on Oct. 12, 2023, Adam S. Meyers, "Deception-Based Responses to Security Attacks", 11 pages.

* cited by examiner

200 —

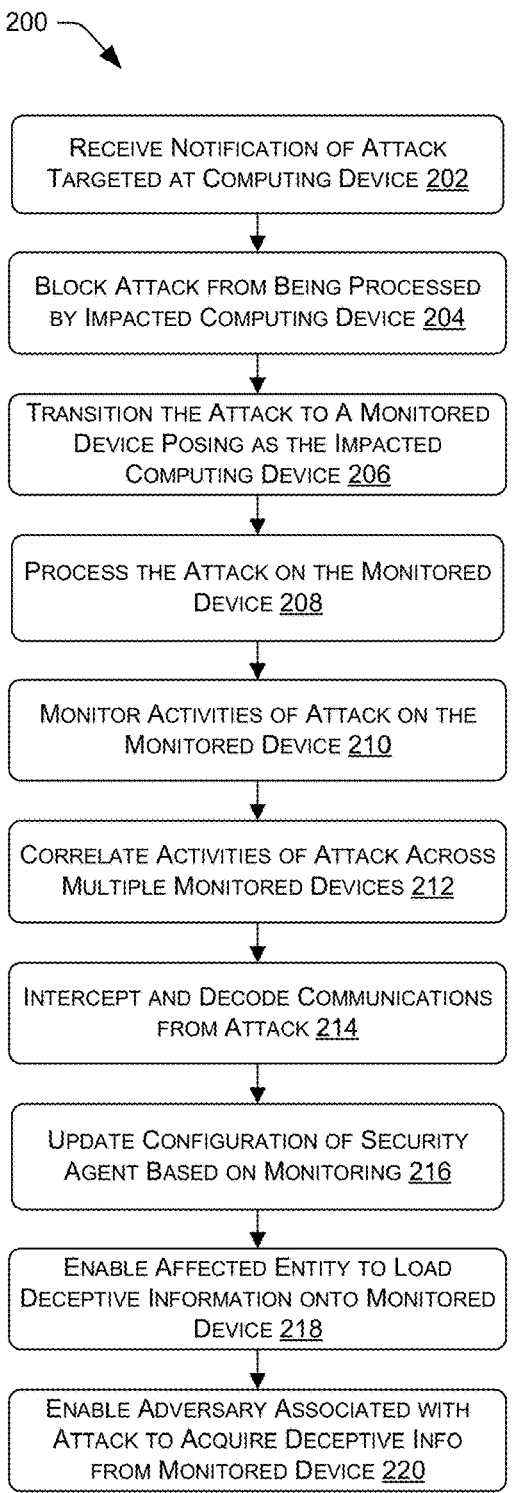

RECEIVE NOTIFICATION OF ATTACK
TARGETED AT COMPUTING DEVICE 202

BLOCK ATTACK FROM BEING PROCESSED
BY IMPACTED COMPUTING DEVICE 204

TRANSITION THE ATTACK TO A MONITORED
DEVICE POSING AS THE IMPACTED
COMPUTING DEVICE 206

PROCESS THE ATTACK ON THE MONITORED
DEVICE 208

MONITOR ACTIVITIES OF ATTACK ON THE
MONITORED DEVICE 210

CORRELATE ACTIVITIES OF ATTACK ACROSS
MULTIPLE MONITORED DEVICES 212

INTERCEPT AND DECODE COMMUNICATIONS
FROM ATTACK 214

UPDATE CONFIGURATION OF SECURITY
AGENT BASED ON MONITORING 216

ENABLE AFFECTED ENTITY TO LOAD
DECEPTIVE INFORMATION ONTO MONITORED
DEVICE 218

ENABLE ADVERSARY ASSOCIATED WITH
ATTACK TO ACQUIRE DECEPTIVE INFO
FROM MONITORED DEVICE 220

CONFIGURE DOCUMENT TO REPORT
IDENTIFYING INFORMATION OF OPENING
DEVICE 302

RECEIVE REPORT ASSOCIATED WITH
DOCUMENT INCLUDING IDENTIFYING
INFORMATION 304

DETERMINE THAT UNAUTHORIZED ENTITY IS
IN POSSESSION OF DOCUMENT 306

ALERT AUTHORIZED ENTITY OF
UNAUTHORIZED POSSESSION OF
DOCUMENT 308

400

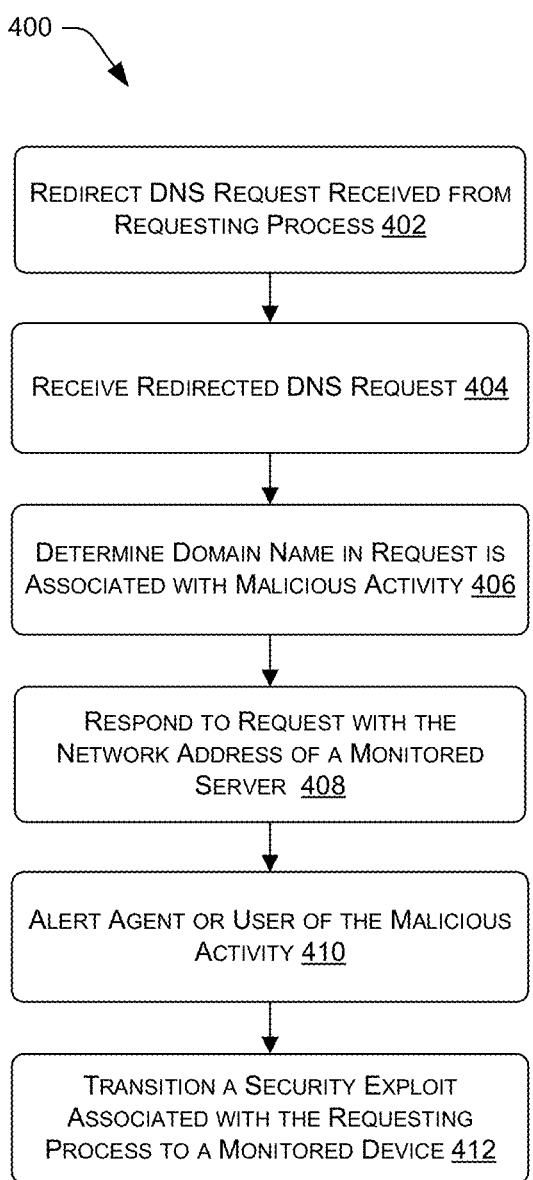

REDIRECT DNS REQUEST RECEIVED FROM REQUESTING PROCESS 402

RECEIVE REDIRECTED DNS REQUEST 404

DETERMINE DOMAIN NAME IN REQUEST IS ASSOCIATED WITH MALICIOUS ACTIVITY 406

RESPOND TO REQUEST WITH THE NETWORK ADDRESS OF A MONITORED SERVER 408

ALERT AGENT OR USER OF THE MALICIOUS ACTIVITY 410

TRANSITION A SECURITY EXPLOIT ASSOCIATED WITH THE REQUESTING PROCESS TO A MONITORED DEVICE 412

DETECT SUSPICIOUS DOMAINS AND ADD TO REPOSITORY 502

MONITOR CHANGES TO NAME RESOLUTIONS OR REGISTRATIONS OF DORMANT DOMAINS 504

ASSOCIATE MONITORED SERVER WITH DORMANT DOMAIN 506

ALERT AGENT OR USER 508

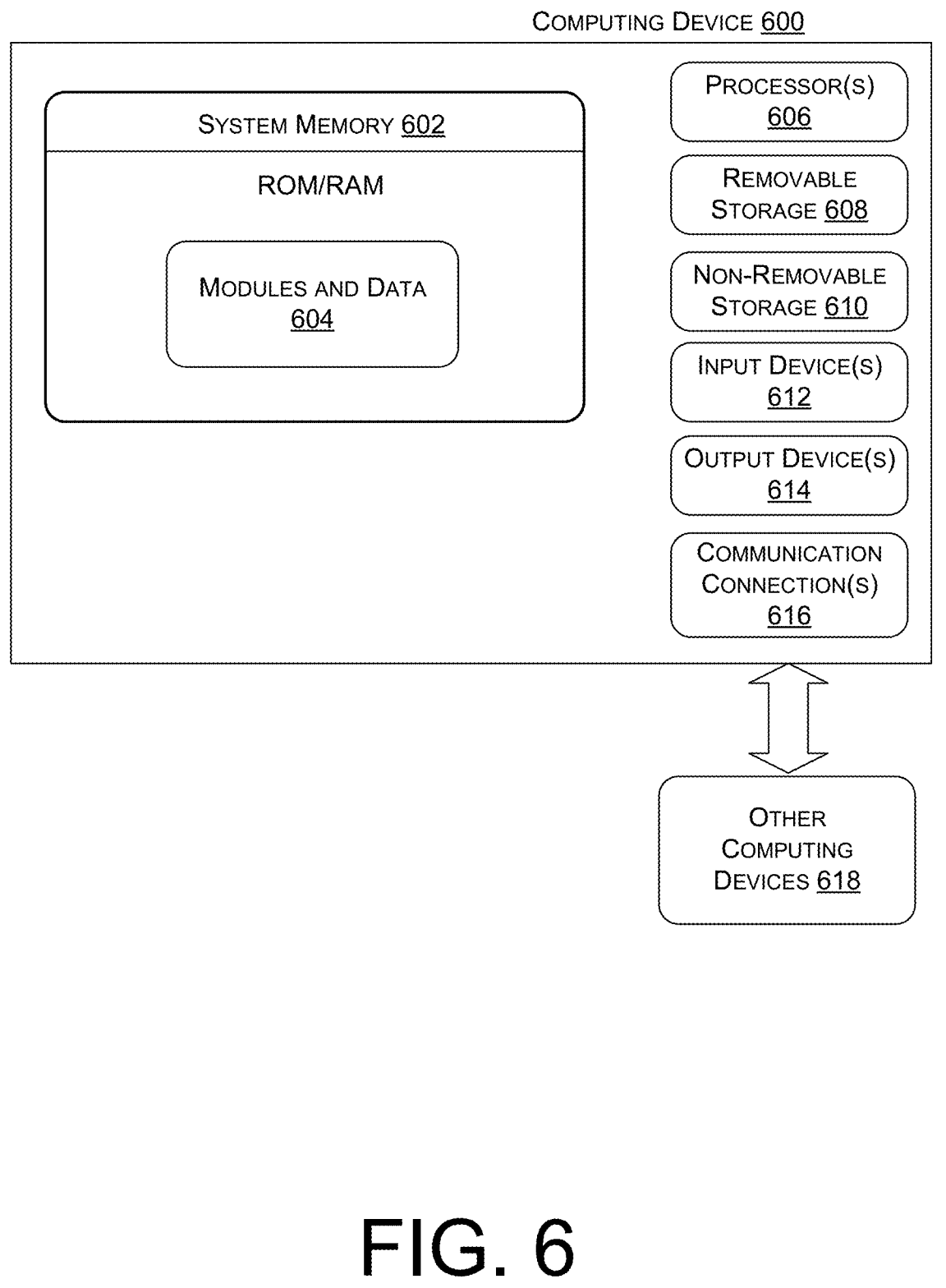

COMPUTING DEVICE 600

SYSTEM MEMORY 602

ROM/RAM

MODULES AND DATA
604

PROCESSOR(S)
606

REMOVABLE
STORAGE 608

NON-REMOVABLE
STORAGE 610

INPUT DEVICE(S)
612

OUTPUT DEVICE(S)
614

COMMUNICATION
CONNECTION(S)
616

OTHER
COMPUTING
DEVICES 618

FIG. 6

DECEPTION-BASED RESPONSES TO SECURITY ATTACKS

RELATED APPLICATION

This application is a continuation of, and claims priority to, U.S. patent application Ser. No. 16/885,174, filed on May 27, 2020, which is a continuation of U.S. patent application Ser. No. 13/784,720, filed on Mar. 4, 2013, entitled "Deception-Based Responses to Security Attacks", now known as U.S. Pat. No. 10,713,356, issued on Jul. 14, 2020, which is incorporated herein by reference.

BACKGROUND

With Internet use forming an ever greater part of day to day life, security exploits that steal or destroy system resources, data, and private information are an increasing problem. Governments and businesses devote significant resources to preventing intrusions and thefts related to these security exploits. Security threats come in many forms, such as computer viruses, worms, trojan horses, spyware, keystroke loggers, adware, and rootkits. These threats typically employ security exploits, which are the weaponization of an attack against a specific vulnerability in software. These threats are delivered in or through a number of mechanisms, such as spearfish emails, clickable links, documents, executables, or archives. Some of the threats posed by security exploits are of such significance that they are described as cyber terrorism or industrial espionage.

To meet the threat posed by these security exploits, many security solutions, such as antivirus software, have been developed. Typically, these solutions scan a computing device, determine if the device is affected by a security threat, and block or remove the security threat. While blocking and removing counter the immediate threat, they are easy for an adversary purveying the security vulnerability to overcome. The affected user is then left always one step behind, always reacting to actions taken by an adversary rather than taking steps to prevent future intrusions and thefts by the adversary.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 2 illustrates an example process for transitioning an attack to device monitored device posing as the computing device impacted by the attack and enabling the attack to obtain deceptive information from the monitored device.

FIG. 4 illustrates an example process for determining that a domain specified in a domain name request is associated with malicious activity and responding to the request with a network address of an monitored device to cause the requesting process to communicate with the monitored device in place of an adversary server.

FIG. 6 illustrates a component level view of a computing device capable of acting as a security service device, a client device, or a monitored device.

DETAILED DESCRIPTION

Overview

Figure 1:
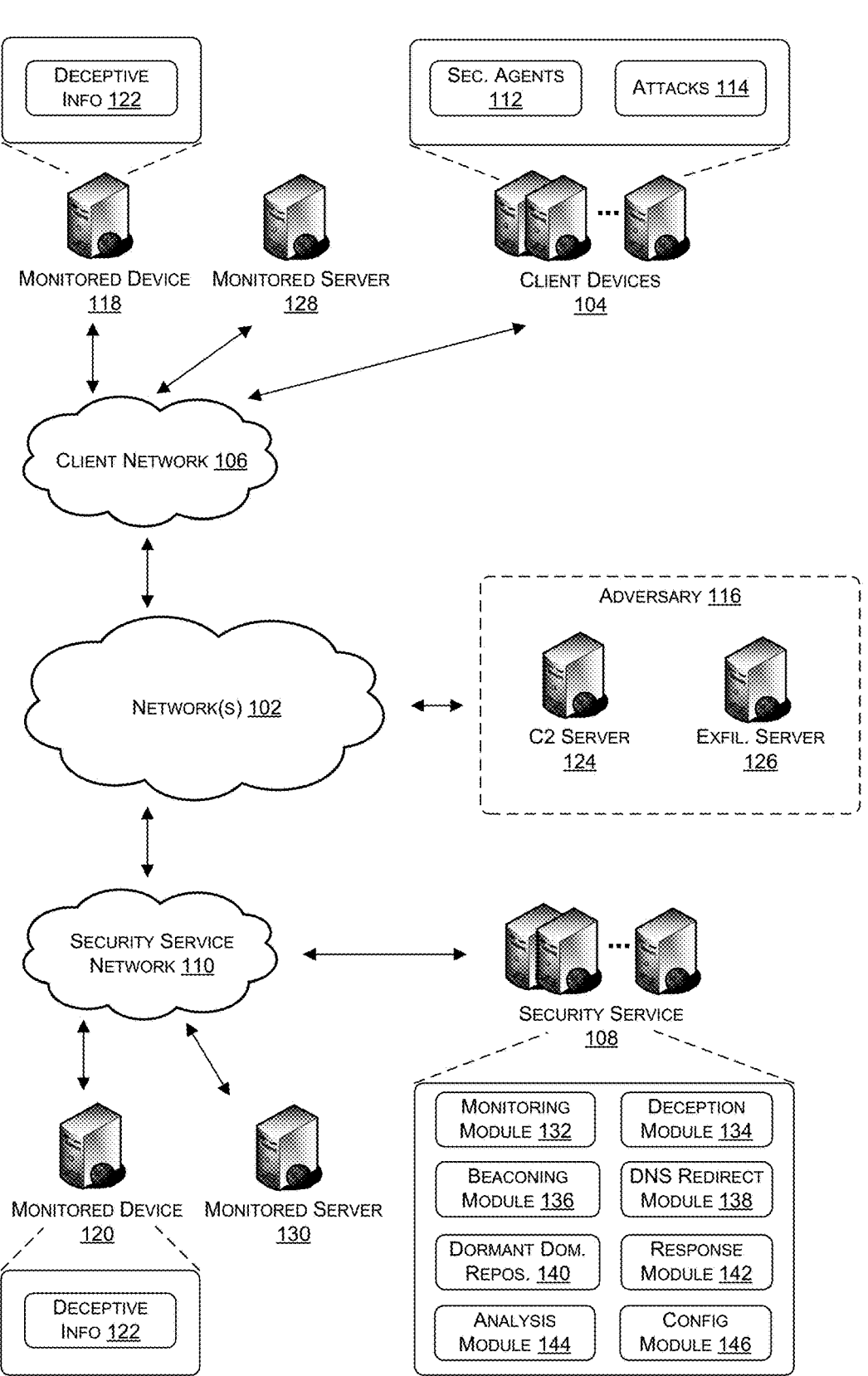
FIG. 1 illustrates an example network connecting a security service to client devices, the security service providing deception-based techniques for responding to attacks affecting the client devices.

This disclosure describes, in part, deception-based techniques for responding to attacks. The techniques include transitioning an attack to a monitored computing process or device (referred to herein as a "monitored device") that is posing as the computing device impacted by the attack and enabling the adversary associated with the attack to obtain deceptive information from the monitored device. The techniques also include identifying the adversary associated with the attack by configuring a document to report identifying information when an unauthorized entity opens the document. Further, the techniques include determining that a domain specified in a domain name request is associated with malicious activity and responding to the request with a network address of a monitored computing process or device (referred to herein as a "monitored server" or a "monitored device") to cause the requesting process to communicate with the monitored server in place of an adversary server. Additionally, the techniques include monitoring dormant domains names associated with malicious activity and, in response to a change in name resolution or registration, responding with an alert or a configuration update.

In various embodiments, a security service may implement or enable any one or more of the deception-based techniques. In a first set of techniques, the security service may utilize monitored devices to run and monitor attacks and to use those attacks to provide deceptive information to an adversary. The adversary may then spend time and effort working on the deceptive information without realizing that the attack has been blocked. Future attacks are thus inhibited as the attacked gains the advantage over the attacker.

When first detecting an attack, a security agent or the security service may block processing of the attack by the impacted device. The security service then transitions the attack to the monitored device and processes the attack on that monitored device. The monitored device poses as the impacted computing device and is configured with a virtual image of the impacted computing device to enable a convincing pose. The security service then monitors activities and communications of the attack and uses information gained from the monitoring to improve deception capabilities and security agent configurations. The security service also enables an entity associated with the impacted computing device to provide deceptive information to be included on the monitored device. For example, if the adversary is a negotiation partner for a business deal attempting to illicitly acquire an entity's negotiating strategy, the entity could provide a false strategy for inclusion on the monitored device.

In a second set of techniques, the security service uses beaconing to identify the adversary, thus enabling better targeting of deceptive information. The security service embeds executable instructions in a document that causes the document to report identifying information to the security service when opened. The security service may also or instead embed a link in the document that causes a request to a monitored network address (e.g., when the document is opened and the link is clicked). The security service is then able to receive the report or request to the monitored network address, determine from it whether the opener is an unauthorized adversary, and determine characteristics of the adversary, such as geographic location. These characteristics can be used to craft better deceptive information or more convincing monitored devices or monitored servers. The security service may also alert a user or security agent program of the unauthorized possession or update a security agent program configuration.

In a third set of techniques, the security service detects the presence of a attack through the attack's specification of a suspicious domain name in a domain name resolution request. In response, the security service deceives the adversary associated with the attack by responding to the request with a network address of an monitored server, the monitored server posing as an adversary server. The monitored server then gathers information from the attack that may be utilized to enhance the effectiveness of other deception techniques, such as improving the deceptive information made available through a monitored device. Also, the security service may alert at least one of a security agent or users of an entity impacted by the attack. In some embodiments, the security service may then transition the attack to a monitored device and perform the above described first set of deception techniques.

In a fourth set of techniques, the security service monitors dormant domain names that have previously been used in connection with malicious activity. By monitoring the domain names for changes in name resolution or registration, the security service may be prepared, having monitored devices or monitored servers ready to use when a attack utilizes one of these monitored domain names. With such techniques, the security service may also perform additional actions, such as detecting other dormant domains and monitoring them, or responding to the change in name resolution or registration by providing an alert or a configuration update.

Example Network

FIG. 1 illustrates an example network connecting a security service to client devices, the security service providing deception-based techniques for responding to attacks impacting the client devices. As illustrated in FIG. 1, a network 102 connects client devices 104 of a client network 106 to a security service 108 of a security service network 110. The security service 108 may configure the client devices 104 with security agents 112, the security agents 112 being capable of detecting attacks 114 of an adversary 116 that are directed at one or more of the client devices 104. In response, the security service 108 may transition the attack to a monitored device 118 included in the client network 106 or an monitored device 120 included in the security service network 110. The monitored device 118/120 may pose as the client device 104 that the attack is directed at and may be configured with a virtual image of that client device 104. The monitored device 118/120 may also include deceptive information 122 for the attack 114 to obtain and provide to the adversary 116. The attack 114 may provide the deceptive information 122 to one or both of a command-and-control (C2) server 124 of the adversary 116 or an exfiltration server 126 of the adversary 116. In some embodiments, the security service 108 may also receive a redirection domain name resolution request made by the attack 114 and may respond to the request by identifying an monitored server 128 included in the client network 106 or an monitored server 130 included in the security service network 110, the monitored server 128/130 posing as the C2 server 124 or exfiltration server 126 to the attack 114.

In various embodiments, devices of the security service 108 may include modules and data 132-146 that enable the security service 108 to perform the operations described herein. These modules and data 132-146 include a monitoring module 132, a deception module 134, a beaconing module 136, a domain name service (DNS) redirection module 138, an dormant domain repository 140, a response module 142, an analysis module 144, and a configuration module 146.

In some embodiments, the network 102, client network 106, and security service network 110 may each include any one or more networks, such as wired networks, wireless networks, and combinations of wired and wireless networks. Further, the network 102, client network 106, and security service network 110 may include any one or combination of multiple different types of public or private networks (e.g., cable networks, the Internet, wireless networks, etc.). For example, the network 102 may be a public network and the client network 106 and security service network 110 may each be a private network. In some instances, computing devices communicate over the network 102, client network 106, and security service network 110 using a secure protocol (e.g., https) and/or any other protocol or set of protocols, such as the transmission control protocol/Internet protocol (TCP/IP). Further, each of the client network 106 and security service network 110 may be assigned a block of network addresses, such as IP addresses.

In various embodiments, the client devices 104, the computing devices of the security service 108, the monitored device 118/120, and the monitored server 128/130 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing devices of the security service 108 represent a plurality of computing devices working in communication, such as a cloud computing network of nodes. When implemented on multiple computing devices, the security service 108 may distribute the modules and data 132-146 of the security service 108 among the multiple computing devices. In some implementations, one or more of the client devices 104, the computing devices of the security service 108, the monitored device 118/120, and the monitored server 128/130 represent one or more virtual machines implemented on one or more computing devices. An example computing device capable of serving as a client device 104, a computing device of the security service 108, the monitored device 118/120, or the monitored server 128/130 is illustrated in FIG. 6 and described below with reference to that figure.

In various embodiments, the client devices 104 and client network 106 may be associated with an entity, such as a business, government, or other organization, or may be associated with a single user or groups of users. That entity or those user(s) may subscribe for security services with the security service 108, which may monitor activities on client devices 104 of the entity/user(s). In some embodiments, that monitoring may involve installing security agents 112 on the client devices 104 to monitor execution activities of the client devices 104 and to report on those activities to the security service 108. In other embodiments, the security service 108 may instead rely on scanning the client devices 104 from a security service scanner or rely on a third party security product or service to detect attacks and communicate them to the security service 108.

Each client device 104 may be any sort of computing device, as described above. Each client device 104 may be configured with an operating system, applications, folders, files, and desktop screens. Further, each client device 104 may be associated with a user name of a user of that client device 104, a machine name of the client device 104, an operating system version, desktop screens, folder names, preloaded files, and computer firmware versions.

In some embodiments, the security agent 112 may be a kernel-level security agent that observes and acts upon execution activities of its corresponding client device 104. The security agent 112 may be configurable by the security service 108, receiving, and applying while live, reconfigurations of filters, components, models, etc. of the security agent 112. Based on the observed execution activities, the security agents 112 may generate security information which the security agent 112 may act upon and/or provide to the security service 108. An example security agent 112 is described in greater detail in U.S. patent application Ser. No. 13/492,672, entitled "Kernel-Level Security Agent" and filed on Jun. 8, 2012.

As mentioned, attacks 114 may be directed at client devices 104. Such attacks 114 comes in many forms, such as computer viruses, worms, trojan horses, spyware, keystroke loggers, adware, and rootkits. These attacks 114 are delivered in or through a number of mechanisms, such as spearfish emails, clickable links, websites, drive by exploits, QR codes, Near Field Communications (NFC) triggered links, documents, executables, removable drives, or archives. The attacks 114 may be detected by the security agents 112 or other security mechanism and may be blocked or stopped from further processing. As mentioned further herein, the attacks 114 may then be transitioned to a monitored device 118/120 by the security service 108.

In various embodiments, the security service 108 may be a provider of information security services to client entities, such as maintenance and configuration of the kernel-level security agents 112, threat modeling, and/or remediation. In some embodiments, the security service 108 may also provide social aspects to the security services, forming groups of those client entities and automatically sharing security information among the client entities 104 constituting a group.

In addition, as described above in some detail, the security service 108 implements any of a number of deception techniques to respond to attacks 114. The modules and data 132-146, monitored devices 118/120, and monitored servers 128/130 may be operated and used by the security service 108 to carry out these techniques.

In various embodiments, the monitoring module 132 may be configured to perform monitoring operations associated with a number of the techniques. For example, in associated with the first set of deception techniques described above, the monitoring module 132 may be configured to detect the presence or operation of attacks 114 on client devices 104 or to receive automated or manual notifications from security agents 112 of the presence or operation of attacks 114. In one embodiment, receiving the automated or manual notification may include retrieving the attack from an information sharing system or portal to which the attack has been submitted. The information sharing system or portal may have received the attack from another entity that is different from the entity associated with client devices 104. In some embodiments, the attack 114 may be included in an email (e.g., as a link or attachment), and a user of the client device 104 may forward the email to the security service 108. In response to detection or received notice, the monitoring module 132 may invoke the deception module 134.

The deception module 134 may take a number of actions to counter the attack 114. First, the deception module 134 may block processing (or halt further processing) of the attack 114 by the affected client device 104. In some embodiments, however, such blocking or halting may be accomplished by the security agent 112 and need not involve the deception module 134.

The deception module 134 may then configure a device on the client network 106 as a monitored device 118 or a device on the security service network 110 as a monitored device 120. To configure the device, the security service 108 may capture and apply a virtual image of the client device 104. In some embodiments, the monitored device 118 may be implemented in a virtual machine or partition of the client device 104 (e.g., as an isolated sandbox). Such a virtual image may include a number of attributes of the client device 104, such as its user name, machine name, operating system version, desktop screens, folder names, preloaded files or computer firmware versions. In other embodiments, the security service 108 may receive this information from a user of the client device 104 rather than capturing the virtual image. If configuring a device on the security service network 110, the deception module may utilize the Border Gateway Protocol (BGP) to have an IP address associated with the client network 106 assigned to the monitored device 120, thereby enabling the monitored device 120 to convincingly pose as a device of the client network 106. After configuring the device to create a monitored device 118/120, the deception module 134 may transition the attack 114 from the client device 104 to the monitored device 118/120 and may process the attack 114 on the monitored device 118/120.

By processing the attack 114 on the monitored device 118/120, the deception module 134 enables monitoring of attack activities and deception of the adversary 116. In some embodiments, the monitoring module 132 may monitor the activities of the attack 114 as it executes. For example, the monitoring module 132 may monitor commands and events issued by the adversary or monitor network activity, file activity, process activity, execution activity, registry activity, operating system activity, firmware updates, kernel extensions, or loaded drivers of the monitored device 118/120. The commands and events issued may include keystrokes, mouse activity, or command line interface activity. Further, the monitoring module 132 may intercept and decode communications from the attack 114 to the adversary 116. The monitoring module 132 may decode the communications by determining the protocol that the communications are using. If the protocol is not familiar, the monitoring module 132 may invoke the analysis module 144 to process the intercepted communications and determine the protocol used.

In some embodiment, the monitoring module 132 may further invoke the response module 142 to provide an alert to the security agents 112 or provide human-consumable intelligence to the client entity/user(s). Alternatively or additionally, the monitoring module 132 or response module 142 may invoke the configuration module 146 to reconfigure the security agents 112 to address the attack 114. The reconfiguration may be based on the activity of the attack 114 captured by the monitoring module 132. In some embodiments, the configuration module 146 may correlate attack activity information received from a number of monitored devices 118/120 and use these correlations in recon-figuring the security agents 112. In some embodiments, the different monitored devices may be associated with different entities.

While the monitoring module 132 monitors activities of the attack 114, the deception module 134 may take actions to deceive the adversary 116. First, the deception module 134 may configure the monitored device 118/120 to mimic user activity by for example, opening a browser window, generating keystrokes, etc. By mimicking user activity, the monitored device 118/120 ensures that its pose will be convincing to an adversary 116.

In addition to configuring the client device 104 to mimic user activity, the deception module 134 enables the client entity/user(s) to load deceptive information 122 onto the monitored device 118/120. As mentioned above, the adversary 116 could be a competitor or enemy engaged in espionage, and the deceptive information 122 could pose as real information, causing the adversary 116 to waste time and effort analyzing the deceptive information 122. The deception module 134 also enables the attack 114 to obtain the deceptive information 122 and to provide the deceptive information 122 to the adversary 116.

In some embodiments, the deception module 134 may maintain the monitored device 118/120 and associated deception over an extended period of time (e.g., weeks, months, or years), feeding new deceptive information to the adversary 116 through its attack 114 throughout the extended period.

In various embodiments, the beaconing module 136 may operate independently of the monitoring module 132 and deception module 134. When a document is created on a client device 104, the beaconing module 136 may configure the document to report identifying information of the device opening the document. Such identifying information may include at least one of a network address, a geographic location, a universally unique identifier (UUID), domain information, or derived/upstream network data. Derived/upstream network data may include upstream router network addresses, network address translation (NAT) data, etc. The beaconing module 136 may achieve this configuration by embedding executable instructions in the document that open a connection to the security service 108 when the document is opened. Alternatively, the beaconing module 136 may achieve this configuration by embedding a link in the document that causes a request to be submitted to a monitored network address. In some embodiments, the executable instructions may specify expected identifying information, such as an expected network address or range or network addresses, and an expected geographic location or range of geographic locations. In such embodiments, the document may only establish a connection to the security service 108 or cause a request to be submitted to the monitored network address when the determined network address or geographic location of the document opener differs from the expected address/location. In other embodiments, rather than the beaconing module 136 configuring the documents of the client device 104, the security agents 112 may perform the configuring.

In further embodiments, the beaconing module 136 may receive the reports or requests sent to the monitored network address from the documents and, in response, determine whether the adversary 116 or some other unauthorized entity/user is in possession of the documents. The beaconing module 136 may perform this determination based on expected identifying information such as an expected net-work address or expected range of network addresses, or based on expected geographic location(s). Such expected information may be received from the client entity/user(s) at the time of registration with the security service 108 or may be received from the security agents 112.

In some embodiments, when the document is determined to be possessed by the adversary 116 or another unauthorized entity, the beaconing module 136 may invoke the response module 142 to provide an alert to the security agents 112 or provide human-consumable intelligence to the client entity/user(s). Alternatively or additionally, the beaconing module 136 or response module 142 may invoke the configuration module 146 to reconfigure the security agents 112 to address the exfiltration of the document.

In various embodiments, the DNS redirect module 138 may operate independently of the beaconing module 136. The DNS redirect module 138 may configure a DNS server of the client network 106 to treat the DNS redirect module 138 as a higher-level DNS and to redirect domain name resolution requests to the DNS redirect module 138. The DNS redirect module 138 may then receive domain name resolution requests and invoke the analysis module 144 to determine whether the domain names included in the domain name resolution requests are associated with malicious activity. In some embodiments, the analysis module 144 makes the determination by determining whether a domain name is included in a list of known malicious or suspicious domains. The analysis module 144 may also or instead determine that the domain name is unfamiliar or is associated with a specific geographic location (e.g., a known geographic location of a known adversary 116 or class or group of adversaries 116).

In some embodiments, when the analysis module 114 informs the DNS redirect module 138 that a domain name is associated with malicious activity, the DNS redirect module 138 invokes the deception module 134 to configure a device in the client network 106 as an monitored server 128 or a device in the security service network 110 as an monitored server 130. The monitored server 128/130 may pose as a C2 server 124 or an exfiltration server 126 of an adversary 116. To make the pose convincing, the deception module 134 may configure the monitored server 128/130 with a plurality of adversary protocols that may be used in decoding com-munications from a attack 114 that made the domain name resolution request. The DNS redirect module 138 may then respond to the domain name resolution request with a network address of the monitored server 128/130 to cause the attack 114 that made the domain name resolution request to communicate with the monitored server 128/130.

In further embodiments, the DNS redirect module 138 may invoke the response module 142 to provide an alert to the security agents 112 or provide human-consumable intel-ligence to the client entity/user(s). Alternatively or addition-ally, the DNS redirect module 138 or response module 142 may invoke the configuration module 146 to reconfigure the security agents 112 to address the exfiltration of the docu-ment.

Additionally, in some embodiments, the DNS redirect module 138 may invoke the deception module to configure a monitored device 118/120 and to transition the attack 114 to the monitored device 118/120. Such transitioning may take place after the attack 114 has communicated with the monitored server 128/130 for some time period.

In various embodiments, the dormant domain name repository 140 may be a repository of dormant domain names that were previously associated with malicious activ-ity. The security service 108 may create the dormant domain name repository 140 from other available repositories of dormant domain names previously associated with malicious activity, by constructing the dormant domain name repository 140 as suspicious dormant domain names are detected, or some combination of both. The security agents 112 may be configured to identify as a suspicious, dormant domain name any locally-resolving domain name (e.g., resolves to network address 127.0.0.1) or any irresolvable domain name. The security agents 112 may inform the security service 108 of these, and the security service 108 may add them to the dormant domain name repository 140.

In some embodiments, the monitoring module 132 may monitor for changes to name resolutions or registrations of the domain names included in the dormant domain name repository 140. The monitoring module 132 may perform this monitoring for changes periodically or continuously. In response to detecting a change, the monitoring module 132 may further invoke the response module 142 to provide an alert to the security agents 112 or provide human-consumable intelligence to the client entity/user(s). Alternatively or additionally, the monitoring module 132 or response module 142 may invoke the configuration module 146 to reconfigure the security agents 112 to appropriately handle the now-active domain names.

In some embodiments, the deception module 134 may also prepare monitored devices 118/120 or monitored servers 128/130 for each dormant domain name in the dormant domain names repository 140, in the manner described above.

In some instances, any or all of the client devices 104, the security service 108, the monitored device 118/120, or the monitored server 128/130 may have features or functionality in addition to those that FIG. 1 illustrates. For example, some or all of the functionality described as residing within any or all of the client devices 104, the security service 108, the monitored device 118/120, or the monitored server 128/130 may reside remotely from that/those device(s).

Example Processes

FIGS. 2-5 illustrate example processes 200, 300, 400, and 500. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 2 illustrates an example process for transitioning an attack to an monitored device posing as the computing device impacted by the attack and enabling the adversary associated with the attack to obtain deceptive information from the monitored device. The process 200 includes, at 202, receiving, by a security service, automated or manual notification of an attack directed at a computing device. In some embodiments, receiving the automated or manual notification may comprise retrieving the attack from an information sharing system or portal to which the attack has been submitted. The attack may be one of a spearfish email, a clickable link, a website, a drive by exploit, a QR code, a Near Field Communications (NFC) triggered link, a document, an executable, a removable drive, or an archive. Further, the notification may be received from a user forwarding the attack or from a security agent monitoring the computing device.

At 204, the security service blocks processing of the attack by the computing device that the attack is targeted at.

At 206, the security service transitions the attack to a monitored device, the monitored device configured to pose as the affected computing device to an adversary associated with the attack. The monitored device may be a physical machine or virtual machine configured with a virtual image of the computing device. The virtual image may include at least one or more of a user name, a machine name, an operating system version, desktop screens, folder names, preloaded files or computer firmware versions associated with the affected computing device. Also, monitored device may be located on a network of an entity associated with the impacted computing device or implemented remotely by the security service. If implemented remotely, the monitored device may be assigned a network address associated with the entity. Further, the monitored device may mimic user activity.

At 208, the security service processes the attack on the monitored device. While processing the attack, the security service may, at 210, monitor commands and events issued by the adversary or monitor network activity, file activity, process activity, execution activity, registry activity, operating system activity, firmware updates, kernel extensions, or loaded drivers of the monitored device. The commands and events issued may include keystrokes, mouse activity, or command line interface activity. At 212, the security service correlates information obtained from monitoring attacks on multiple monitored devices. At 214, while monitoring, the security service intercepts and decodes communications from the attack to the adversary system. At 216, the security service updates configuration of security agent implemented on the affected device based at least in part on the monitoring or provides human-consumable intelligence.

At 218, the security service enables an entity associated with the affected computing device to load deceptive information onto the monitored device posing as that impacted device. At 220, the security service may then enable the adversary associated with the attack to obtain the deceptive information. In some embodiments, the monitoring of the attack and the enabling of it to provide deceptive information may occur over an extended period of time (e.g., weeks, months, or years). While performing the enabling at 220, the security service may receive intelligence from the adversary about at least one of the adversary's tools, tactics, techniques, or procedures.

Figure 3:
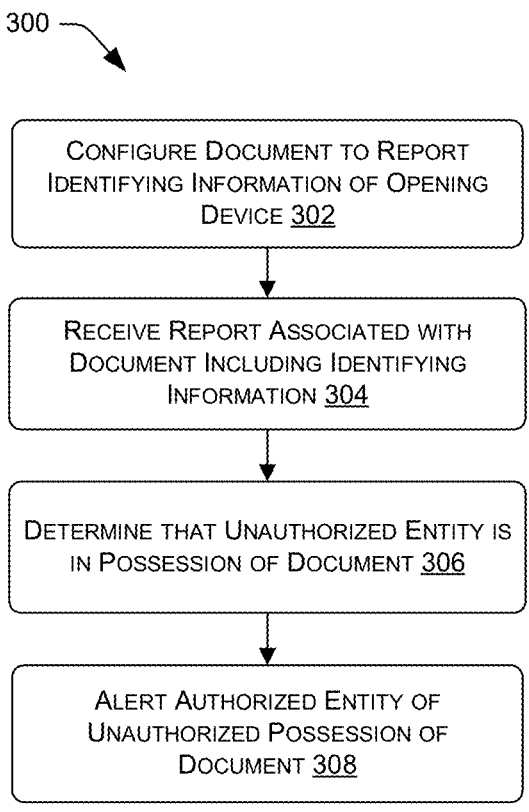
FIG. 3 illustrates an example process for configuring a document to report identifying information of an entity opening the document to enable determination of whether an unauthorized entity is in possession of the document.

FIG. 3 illustrates an example process for configuring a document to report identifying information of an entity opening the document to enable determination of whether an unauthorized entity is in possession of the document. The process 300 includes, at 302, configuring a document to report identifying information of a device opening the document to the security service. Such identifying information may include at least one of a network address, a geographic location, a universally unique identifier (UUID), domain information, or derived/upstream network data. In some embodiments, the configuring includes embedding executable instructions in the document. The executable instructions embedded in the document may be configured to open a connection to the security service and to perform the reporting based at least in part on whether the identifying information differs from identifying information embedded in the document. Alternatively, the configuring may include embedding a link in the document that causes a request to be submitted to a monitored network address.

At 304, the security service may receive a report associated with the document, the report including the identifying information.

At 306, the security service may determine, based on the at least one of the identifying information, that unauthorized entity is in possession of the document.

At 308, the security service may alert an entity associated with the document of the possession by the unauthorized entity.

FIG. 4 illustrates an example process for determining that a domain specified in a domain name request is associated with malicious activity and responding to the request with a network address of an monitored server to cause the requesting process to communicate with the monitored server in place of an adversary server. The process 400 includes, at 402, redirecting a domain name resolution request from a domain name server associated with a device or entity implementing a process that submitted the domain name resolution request.

At 404, a security service receives the redirected domain name resolution request.

At 406, the security service determines that a domain name included in the domain name resolution request is indicative of malicious activity. In some embodiments, the determining comprises determining whether the domain name is included in a list of known malicious or suspicious domains. The determining may also or instead comprise determining that the domain name is unfamiliar, is associated with a specific geographic location, or is associated with a specific entity.

At 408, the security service responds to the domain name resolution request with a network address of a monitored server to cause the requesting process to communicate with the monitored server in place of an adversary server. In some embodiments, the monitored server poses as an adversary command-and-control system or an adversary exfiltration system to the requesting process, the requesting process being a attack. Also, the monitored server may decode the communications from the requesting process. Further, the monitored server may determine that the requesting process is utilizing a new protocol to encode the communications and analyze the communications to learn the new protocol.

At 410, the security service alerts at least one of a security agent or users of an entity affected by an attack associated with the requesting process.

At 412, the security service transitions an attack associated with the requesting process to an monitored device, the monitored device posing as the computing device impacted by the attack.

Figure 5:
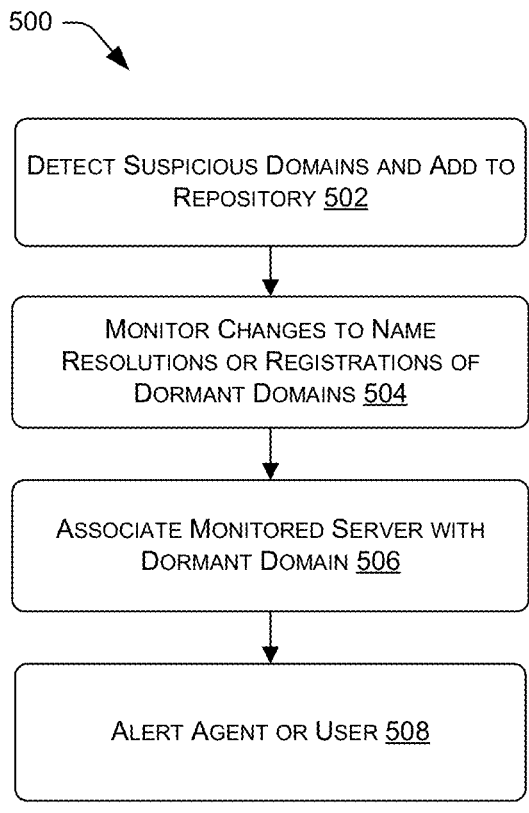
FIG. 5 illustrates an example process for monitoring dormant domains names associated with malicious activity and, in response to a change, responding with an alert or a configuration update.

FIG. 5 illustrates an example process for monitoring dormant domains names associated with malicious activity and, in response to a change, responding with an alert or a configuration update. The process 500 includes, at 502, detecting suspicious domain names to add to a repository of dormant domain names by identifying whether the domain name resolves to local network address, whether the domain name resolves to non-routable network address, or whether the domain name fails to resolve and then ascertaining whether the domain name is associated with malicious activity. Dormant domain names associated with malicious activity are then added to the repository.

At 504, a security service associated with the repository monitors for changes to name resolutions or registrations of domain names included in the repository. The monitoring may include continuously or periodically resolving the dormant domain names to determine if their name resolutions have changed.

At 506, the security service associates a monitored server with one of the dormant domain names and, in response to the dormant domain name becoming active, responds to domain name resolution requests specifying the now-active domain name with a network address of the monitored server.

At 508, the security service may perform at least one of updating a security agent configuration or alerting a security service user based on the detected changes.

Example System

FIG. 6 illustrates a component level view of a computing device capable of acting as a security service device, a client device, an monitored device, or an monitored server. As illustrated, computing device 600 comprises a system memory 602 storing modules and data 604. Also, computing device 600 includes processor(s) 606, a removable storage 608 and non-removable storage 610, input device(s) 612, output device(s) 614 and communication connections 616 for communicating with other computing devices 618.

In various embodiments, system memory 602 is volatile (such as RAM), non-volatile (such as ROM, flash memory, etc.) or some combination of the two. The modules or data 604 stored in the system memory 602 may comprise methods, threads, processes, applications or any other sort of executable instructions, such as the instructions utilized to perform the operations of the client devices 104, security service 108, monitored devices 118/120, or monitored servers 128/130. The modules and data 604 may also include files and databases.

In some embodiments, the processor(s) 606 is a central processing unit (CPU), a graphics processing unit (GPU), or both CPU and GPU, or other processing unit or component known in the art.

Computing device 600 also includes additional data storage devices (removable and/or non-removable) such as, for example, magnetic disks, optical disks, or tape. Such additional storage is illustrated in FIG. 6 by removable storage 608 and non-removable storage 610. Tangible computer-readable media may include volatile and nonvolatile, removable and non-removable media implemented in any method or technology for storage of information, such as computer readable instructions, data structures, program modules, or other data. System memory 602, removable storage 608 and non-removable storage 610 are all examples of computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 600. Any such tangible computer-readable media may be part of the computing device 600.

Computing device 600 also has input device(s) 612, such as a keyboard, a mouse, a touch-sensitive display, voice input device, etc., and output device(s) 614 such as a display, speakers, a printer, etc. These devices are well known in the art and need not be discussed at length here.

Computing device 600 also contains communication connections 616 that allow the computing device 600 to communicate with other computing devices 618, such as others of the security service devices, the client devices, monitored devices, monitored servers, or adversary systems.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method implemented by a computing device having a processor and a memory, the method comprising:

receiving data associated with an attack on a computing device;

transitioning the data associated with the attack to a monitored computing device that is configured to pose to an adversary as the computing device impacted by the attack;

enabling an entity associated with the computing device impacted by the attack to load deceptive information to the monitored computing device;

enabling the adversary to obtain the deceptive information from the monitored computing device;

monitoring subsequent activities on the monitored computing device;

determining, based on the subsequent activities, a geographic location of the adversary;

updating, based at least in part on the geographic location of the adversary, the deceptive information to generate updated deceptive information;

enabling the adversary to obtain the updated deceptive information from the monitored computing device;

monitoring additional activities on a second monitored computing device configured to pose to the adversary as the computing device impacted by the attack;

correlating information obtained from the subsequent activities on the monitored computing device and the additional activities on the second monitored computing device to obtain correlated information; and updating a configuration associated with a security agent of the computing device impacted by the attack based at least in part on the correlated information.

2. The method of claim 1, wherein the attack includes at least one of a spearfish email, a clickable link, a website, a drive by exploit, a Quick-Response (QR) code, a Near Field Communications (NFC) triggered link, a document, an executable, a removable drive, or an archive.

3. The method of claim 1, further comprising:

retrieving the data associated with the attack from an information sharing system or a portal of a second computing device to which the attack has been submitted, and installing the data associated with the attack on the monitored computing device.

4. The method of claim 1, wherein the monitored computing device is a physical computing device or a virtual computing device, and the monitored computing device is configured with an image of the computing device impacted by the attack illustrating at least one of a name, an operating system version, desktop screens, folder names, preloaded files or computer firmware versions associated with the computing device.

5. The method of claim 1, wherein the monitored computing device is implemented remotely by a security service and assigned with a network address or a domain associated with the computing device.

6. The method of claim 1, wherein the subsequent activities on the monitored computing device include at least one of:

commands and events issued by the adversary to the monitored computing device, or network activity, file activity, process activity, execution activity, registry activity, operating system activity, firmware updates, loaded drivers, or kernel extensions of the monitored computing device.

7. The method of claim 1, wherein the data associated with the attack includes a redirection domain name resolution request, and the method further comprises:

transitioning the data associated with the attack to the second monitored computing device, the second monitored computing device being configured to pose to the adversary as the computing device impacted by the attack.

8. The method of claim 1, further comprising:

intercepting communication from the adversary to the monitored computing device;

decoding the communication to identify a new protocol used for the communication; and configuring the monitored computing device to communicate with the adversary by using the new protocol.

9. The method of claim 1, further comprising:

pre-determining a set of monitored computing devices based at least in part on malicious dormant domain names identified in past activities;

determining that the data associated with the attack includes a redirection domain name resolution request; and identifying a candidate monitored computing device from the set of monitored computing devices based at least in part on comparing a domain name in the redirection domain name resolution request with the malicious dormant domain names.

10. A system comprising:

one or more processors; and memory communicatively coupled to the one or more processors, the memory storing instructions executable by the one or more processors that, when executed by the one or more processors, cause the system to perform operations including:

receiving data associated with an attack on a computing device;

transitioning the data associated with the attack to a monitored computing device that is configured to pose to an adversary as the computing device impacted by the attack;

enabling an entity associated with the computing device impacted by the attack to load deceptive information to the monitored computing device;

enabling the adversary to obtain the deceptive information from the monitored computing device;

monitoring subsequent activities on the monitored computing device;

determining, based on the subsequent activities, a geographic location of the adversary;

updating, based at least in part on the geographic location of the adversary, the deceptive information to generate updated deceptive information;

enabling the adversary to obtain the updated deceptive information from the monitored computing device;

monitoring additional activities on a second monitored computing device configured to pose to the adversary as the computing device impacted by the attack;

correlating information obtained from the subsequent activities on the monitored computing device and the additional activities on the second monitored computing device to obtain correlated information; and updating a configuration associated with a security agent of the computing device impacted by the attack based at least in part on the correlated information.

11. The system of claim 10, wherein the attack includes at least one of a spearfish email, a clickable link, a website, a drive by exploit, a Quick-Response (QR) code, a Near Field Communications (NFC) triggered link, a document, an executable, a removable drive, or an archive.

12. The system of claim 10, wherein the instructions, when executed by the one or more processors, further cause the system to perform operations including:

retrieving the data associated with the attack from an information sharing system or a portal of a second computing device to which the attack has been submitted, and installing the data associated with the attack on the monitored computing device.

13. The system of claim 10, wherein the monitored computing device is a physical computing device or a virtual computing device, and the monitored computing device is configured with an image of the computing device impacted by the attack illustrating at least one of a name, an operating system version, desktop screens, folder names, preloaded files or computer firmware versions associated with the computing device.

14. The system of claim 10, wherein the monitored computing device is implemented remotely by a security service and assigned with a network address or a domain associated with the computing device.

15. The system of claim 10, wherein the instructions, when executed by the one or more processors, further cause the system to monitor at least one of:

commands and events issued by the adversary to the monitored computing device, or network activity, file activity, process activity, execution activity, registry activity, operating system activity, firmware updates, loaded drivers, or kernel extensions of the monitored computing device.

16. The system of claim 10, wherein the data associated with the attack includes a redirection domain name resolution request, and the instructions, when executed by the one or more processors, further cause the system to perform operations including:

transitioning the data associated with the attack to the second monitored computing device, the second monitored computing device being configured to pose to the adversary as the computing device impacted by the attack.

17. A non-transitory computer-readable storage medium storing computer-readable instructions executable by one or more processors, that when executed by the one or more processors, cause the one or more processors to perform operations comprising:

receiving data associated with an attack on a computing device;

transitioning the data associated with the attack to a monitored computing device that is configured to pose to an adversary as the computing device impacted by the attack;

enabling an entity associated with the computing device impacted by the attack to load deceptive information to the monitored computing device;

enabling the adversary to obtain the deceptive information from the monitored computing device;

monitoring subsequent activities on the monitored computing device;

determining, based on the subsequent activities, a geographic location of the adversary;

updating, based at least in part on the geographic location of the adversary, the deceptive information to generate updated deceptive information;

enabling the adversary to obtain the updated deceptive information from the monitored computing device;

monitoring additional activities on a second monitored computing device configured to pose to the adversary as the computing device impacted by the attack;

correlating information obtained from the subsequent activities on the monitored computing device and the additional activities on the second monitored computing device to obtain correlated information; and updating a configuration associated with a security agent of the computing device impacted by the attack based at least in part on the correlated information.

18. The non-transitory computer-readable storage medium of claim 17, wherein the computer-readable instructions, when executed by the one or more processors, further cause the one or more processors to perform operations comprising:

retrieving the data associated with the attack from an information sharing system or a portal of a second computing device to which the attack has been submitted, and installing the data associated with the attack on the monitored computing device.

19. The non-transitory computer-readable storage medium of claim 17, wherein the monitored computing device is a physical computing device or a virtual computing device, and the monitored computing device is configured with an image of the computing device impacted by the attack illustrating at least one of a name, an operating system version, desktop screens, folder names, preloaded files or computer firmware versions associated with the computing device.

20. The non-transitory computer-readable storage medium of claim 17, wherein the data associated with the attack includes a redirection domain name resolution request, and the computer-readable instructions, when executed by the one or more processors, further cause the one or more processors to perform operations comprising:

transitioning the data associated with the attack to the second monitored computing device, the second monitored computing device being configured to pose to the adversary as the computing device impacted by the attack.

* * * * *